United States Patent
Bittmann et al.

(10) Patent No.: US 11,403,268 B2
(45) Date of Patent: Aug. 2, 2022

(54) PREDICTING TYPES OF RECORDS BASED ON AMOUNT VALUES OF RECORDS

(71) Applicant: SAP SE, Walldorf (DE)

(72) Inventors: Ran Bittmann, Tel Aviv (IL); Lev Sigal, Karmiel (IL); Anna Fishbein, Hadera (IL)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/987,166

(22) Filed: Aug. 6, 2020

(65) Prior Publication Data

US 2022/0043788 A1 Feb. 10, 2022

(51) Int. Cl.
| | |
|---|---|
| *G06F 16/24* | (2019.01) |
| *G06F 16/215* | (2019.01) |
| *G06F 16/2455* | (2019.01) |
| *G06F 16/25* | (2019.01) |
| *G06K 9/62* | (2022.01) |
| *G06F 17/18* | (2006.01) |
| *G06F 16/2453* | (2019.01) |

(52) U.S. Cl.
CPC ...... *G06F 16/215* (2019.01); *G06F 16/24539* (2019.01); *G06F 16/24552* (2019.01); *G06F 16/258* (2019.01); *G06F 17/18* (2013.01); *G06K 9/6226* (2013.01)

(58) Field of Classification Search
CPC ............. G06F 16/258; G06F 16/24552; G06F 16/24539; G06F 16/215; G06F 16/2462; G06F 16/9535; G06F 7/18; G06K 9/6226
See application file for complete search history.

(56) References Cited

U.S. PATENT DOCUMENTS

| | | | | |
|---|---|---|---|---|
| 11,194,832 | B2 * | 12/2021 | Bhojwani | G06F 16/2272 |
| 11,277,484 | B2 * | 3/2022 | Rogynskyy | G06N 5/025 |
| 2005/0102325 | A1 * | 5/2005 | Gould | G06F 16/24554 |
| 2006/0093222 | A1 * | 5/2006 | Saffer | G06K 9/6218 |
| | | | | 707/E17.093 |
| 2010/0153328 | A1 * | 6/2010 | Cormode | G06N 5/02 |
| | | | | 706/52 |
| 2013/0246342 | A1 * | 9/2013 | Faith | G06F 16/2379 |
| | | | | 707/607 |
| 2014/0358931 | A1 * | 12/2014 | Garera | G06F 16/258 |
| | | | | 707/740 |
| 2017/0052958 | A1 * | 2/2017 | Manning | G06F 16/24578 |
| 2018/0203904 | A1 * | 7/2018 | Barsness | G06F 16/24575 |
| 2019/0361849 | A1 * | 11/2019 | Rogynskyy | G06F 16/9035 |
| 2019/0391975 | A1 * | 12/2019 | Jiang | G06F 16/9535 |
| 2021/0142879 | A1 * | 5/2021 | Brockmeier | G16H 10/60 |
| 2021/0374886 | A1 * | 12/2021 | Reitz | G06K 9/623 |

* cited by examiner

*Primary Examiner* — Merilyn P Nguyen
(74) *Attorney, Agent, or Firm* — Fountainhead Law Group P.C.

(57) ABSTRACT

Some embodiments provide a non-transitory machine-readable medium that stores a program. The program queries a database for a subset of a plurality of records in the database. Each record in the plurality of records includes a value for a first field and a second value for a second field. The program further normalizes the first value of the first field of each record in the subset of the plurality of records. The program also divides the subset of the plurality of records into a plurality of groups of records based on the second values of the second field. The program further generates a function for predicting a type of a particular record based on the value of the field of the particular record.

20 Claims, 9 Drawing Sheets

| | Breakfast | Lunch | Dinner |
|---|---|---|---|
| Mean | 13.4 | 22.3 | 44.5 |
| Trimmed Mean | 5.7 | 8.5 | 16.1 |
| Median | 6.65 | 9.78 | 20.12 |
| Mode | 2 | 9 | 38 |

FIG. 2

PREDICTING TYPES OF RECORDS BASED ON AMOUNT VALUES OF RECORDS

BACKGROUND

In data processing, many different techniques and approaches may be used to analyze sets of data and discover useful information from the sets of data. For example, data cleansing operations can be performed on sets of data in order to identify incorrect or corrupt data and either fix or remove the identified data. Data transformation may be performed on sets of data in order to convert the data into a desirable format or structure that is easier or more efficient to work with.

SUMMARY

In some embodiments, a non-transitory machine-readable medium stores a program executable by at least one processing unit of a device. The program queries a database for a subset of a plurality of records in the database. Each record in the plurality of records includes a value for a first field and a second value for a second field. The program further normalizes the first value of the first field of each record in the subset of the plurality of records. The program also divides the subset of the plurality of records into a plurality of groups of records based on the second values of the second field. The program further generates a function for predicting a type of a particular record based on the value of the field of the particular record.

In some embodiments, generating the function may include, for each group of records, calculating a descriptive statistic of the first values of the first field of records in the group of records. The function may determine the type of the particular record by determining the descriptive statistic in the plurality of descriptive statistics that is closest to the value of the field of the particular record and determining the type of the particular record based on the second values of records in the group of records from which the determined descriptive statistic is calculated. The descriptive statistic may be a mean value, a median value, or a mode value.

In some embodiments, generating the function may include, for each group of records, calculating a probability density function of the first values of the first field of records in the group of records. The function may determine the type of the particular record by calculating a probability value using the value of the field of the particular record as input to each probability density function in the plurality of probability density functions, determining a highest probability value in the plurality of probability values, and determining the type of the particular record based on the second values of records in the group of records from which the probability density function of the determined highest probability value is calculated. Calculating the probability density function for each group of records may include using a kernel density estimation algorithm.

In some embodiments, each record in the plurality of records may further include a third value for a third field. Normalizing the value for the field of each record in the subset of the plurality of records may include calculating a quotient by dividing the first value for the first field by the third value of the third field and using the quotient as the normalized first value for the first field. Dividing the subset of the plurality of records into the plurality of groups of records based on the second values of the second field may include dividing the subset of the plurality of records into the plurality of groups of records so that records in each group of records have the same second values for the second field.

In some embodiments, a method queries a database for a subset of a plurality of records in the database. Each record in the plurality of records includes a value for a first field and a second value for a second field. The method further normalizes the first value of the first field of each record in the subset of the plurality of records. The method also divides the subset of the plurality of records into a plurality of groups of records based on the second values of the second field. The method further generates a function for predicting a type of a particular record based on the value of the field of the particular record.

In some embodiments, generating the function may include, for each group of records, calculating a descriptive statistic of the first values of the first field of records in the group of records. The function may determine the type of the particular record by determining the descriptive statistic in the plurality of descriptive statistics that is closest to the value of the field of the particular record and determining the type of the particular record based on the second values of records in the group of records from which the determined descriptive statistic is calculated. The descriptive statistic may be a mean value, a median value, or a mode value.

In some embodiments, generating the function may include, for each group of records, calculating a probability density function of the first values of the first field of records in the group of records. The function may determine the type of the particular record by calculating a probability value using the value of the field of the particular record as input to each probability density function in the plurality of probability density functions, determining a highest probability value in the plurality of probability values, and determining the type of the particular record based on the second values of records in the group of records from which the probability density function of the determined highest probability value is calculated. Calculating the probability density function for each group of records may include using a kernel density estimation algorithm.

In some embodiments, each record in the plurality of records may further include a third value for a third field. Normalizing the value for the field of each record in the subset of the plurality of records may include calculating a quotient by dividing the first value for the first field by the third value of the third field and using the quotient as the normalized first value for the first field. Dividing the subset of the plurality of records into the plurality of groups of records based on the second values of the second field may include dividing the subset of the plurality of records into the plurality of groups of records so that records in each group of records have the same second values for the second field.

In some embodiments, a system includes a set of processing units and a non-transitory machine-readable medium that stores instructions. The instructions cause at least one processing unit to query a database for a subset of a plurality of records in the database. Each record in the plurality of records includes a value for a first field and a second value for a second field. The instructions further cause the at least one processing unit to normalize the first value of the first field of each record in the subset of the plurality of records. The instructions also cause the at least one processing unit to divide the subset of the plurality of records into a plurality of groups of records based on the second values of the second field. The instructions further cause the at least one processing unit to generate a function for predicting a type of a particular record based on the value of the field of the particular record.

In some embodiments, generating the function may include, for each group of records, calculating a descriptive statistic of the first values of the first field of records in the group of records. The function may determine the type of the particular record by determining the descriptive statistic in the plurality of descriptive statistics that is closest to the value of the field of the particular record and determining the type of the particular record based on the second values of records in the group of records from which the determined descriptive statistic is calculated. The descriptive statistic may be a mean value, a median value, or a mode value.

In some embodiments, generating the function may include, for each group of records, calculating a probability density function of the first values of the first field of records in the group of records. The function may determines the type of the particular record by calculating a probability value using the value of the field of the particular record as input to each probability density function in the plurality of probability density functions, determining a highest probability value in the plurality of probability values, and determining the type of the particular record based on the second values of records in the group of records from which the probability density function of the determined highest probability value is calculated. Calculating the probability density function for each group of records may include using a kernel density estimation algorithm.

In some embodiments, each record in the plurality of records may further include a third value for a third field. Normalizing the value for the field of each record in the subset of the plurality of records may include calculating a quotient by dividing the first value for the first field by the third value of the third field and using the quotient as the normalized first value for the first field.

The following detailed description and accompanying drawings provide a better understanding of the nature and advantages of various embodiments of the present disclosure.

BRIEF DESCRIPTION OF THE DRAWINGS

FIG. 2 illustrates examples of descriptive statistics for different types of records according to some embodiments.

DETAILED DESCRIPTION

Figure 1:
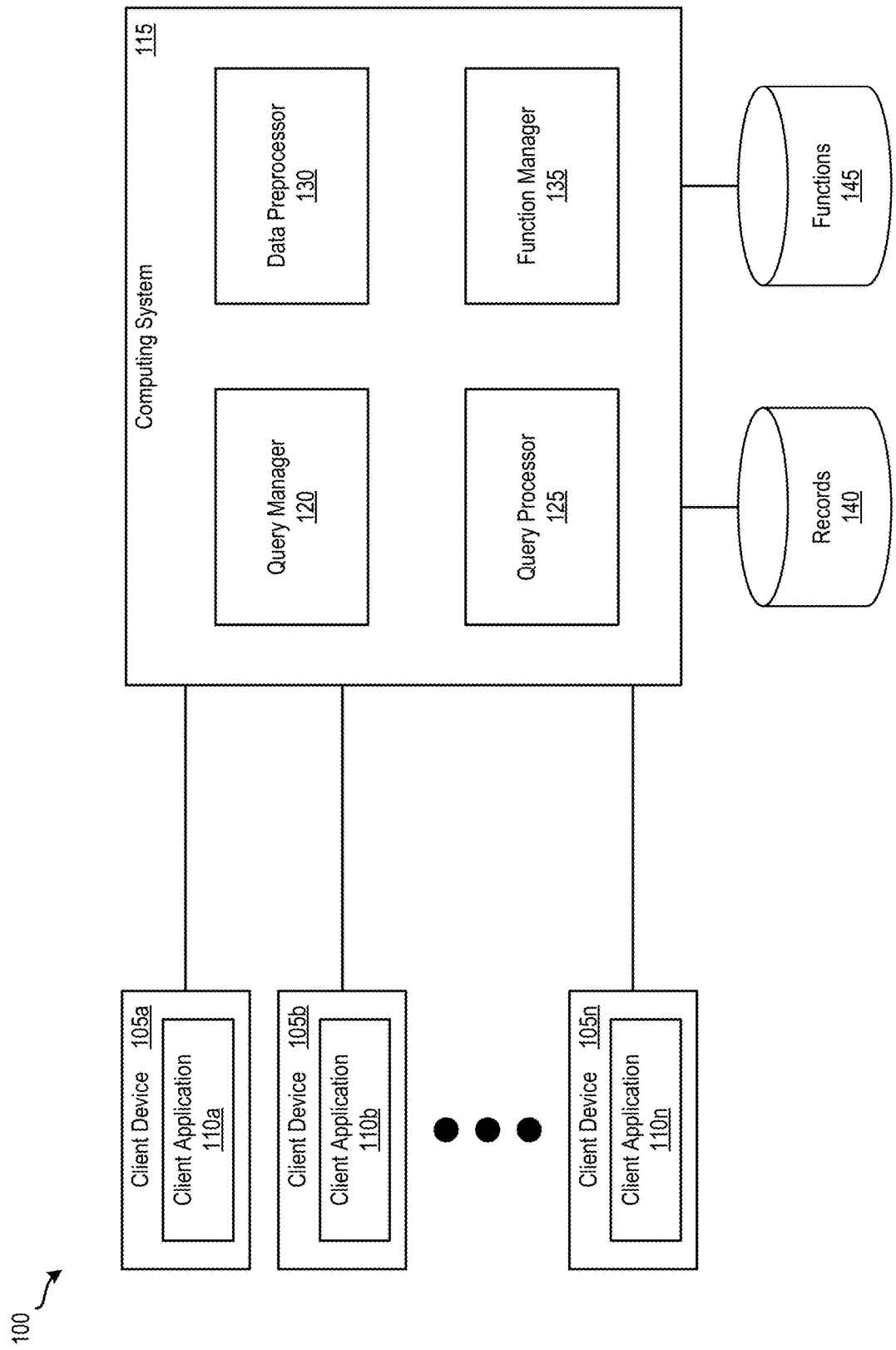
FIG. 1 illustrates a system for predicting types of records according to some embodiments.

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for predicting types of records based on amount values of records. In some embodiments, a computing system may receive data records (also referred to as records) from any number of different client devices and store them in a storage. Each of the received records includes a first field and a second field. The computing system periodically determines a function for different subsets of records stored in the storage. The function can be used to predict a type of a record based on a value of the first field of the record. To determine a function for a particular subset of records, the computing system queries the storage for the subset of records. Next, the computing system may normalize values in the first field of the subset of records. Then, the computing system divides the subset of records into different groups of records based on values in the second field of the subset of records. The computing system uses different techniques to generate a function for the particular subset of records. For example, the computing system can calculate descriptive statistics for each group of records and generate the function based on the descriptive statistics. As another example, the computing system may determine probability density functions for each group of records and generate the function based on the probability density functions.

As mentioned above, the techniques described here are used to predict types of records based on amount values of records. There are many applications to which the techniques may be applied. For example, the computing system may be an expense management system that manages and processes expense reports received from client devices. Each expense report includes one or more line items. Each line item can include a number of different fields such as, for example, a date, a vendor name, a location, an expense category, a type of expense in an expense category, an amount of the expense, etc. In some instances, the particular field of interest is the type of expense in an expense category. The techniques described here can be applied to determine a function for a given set of line items that have the same expense category, the same location, etc. or any combination thereof. The determined function may be used to predict a type of expense in an expense category. The predicted type can be used as a default type for newly received expense reports. Also, the predicted type may be used when analyzing data of existing expense reports.

FIG. 1 illustrates a system 100 for predicting types of records according to some embodiments. As shown, system 100 includes client devices 105a-n, computing system 115, records storage 140, and functions storage 145. Records storage 140 is configured to store records (e.g., line items in expense reports) received from client devices 105a-n. Functions storage 145 can store calculated statistics and functions for different subsets of records stored in records storage 140. In some embodiments, storages 140 and 145 are implemented in a single physical storage while, in other embodiments, storages 140 and 145 may be implemented across several physical storages. While FIG. 1 shows storages 140 and 145 as external to computing system 115, one of ordinary skill in the art will appreciate that records storage 140 and/or functions storage 145 may be part of computing system 115 in some embodiments.

Client devices 105a-n can be configured to communicate and interact with computing system 115. For example, each client device 100 includes a client application (e.g., a desktop application, a mobile application, a web browser, etc.) operating on the client device 110. A user of a client device 110 may use the client application to access computing system 115 and transmit records to computing system 115. In some embodiments, the records are line items that the user of the client device 110 sends to computing system 115 in the form of expense reports. An expense report can include one or more line items. Each line item in an expense report can include a set of fields. Examples of fields in a line item include a date on which the expense was incurred, a name of a vendor associated with the expense, a location where the expense was incurred, a category of the expense (e.g., meals, lodging, transport, parking, entertainment, etc.), a type of expense in an expense category (e.g., breakfast meal, lunch meal, dinner meal, etc., in the meal category; hotel lodging, motel lodging, hostel lodging, campground lodging, etc. in the lodging category; taxi transport, airplane transport, train transport, etc. in the transport category; etc.), an amount of the expense, etc. After a user of a client device 105 transmits a record to computing system, in some instances, the user of the client device 105 can receive a notification from computing system 115 indicating the record is to be reviewed. Upon review, the record has a type of expense automatically selected (by computing system 115) for the expense category of each line item. The user of the client device 105 may review and optionally edit and submit the type of expense accordingly.

Computing system 115 is configured to manage records and determine threshold values for different subsets of records. For instance, computing system 115 may receive records from client devices 105a-n. Upon receiving records from a client device 105, computing system 115 stores them in records storage 140. As mentioned above, in some embodiments, the records received from client devices 105a-n are line items. In some such embodiments, the line items that computing system 115 receives from client devices 105a-n are in the form of expense reports.

As shown in FIG. 1, computing system 115 includes query manager 120, query processor 125, data preprocessor 130, and function manager 135. Query manager 120 is configured to manage queries for subsets of records stored in records storage 140. In some embodiments, the queries are predefined queries for a particular subset of records (e.g., a particular set of historic records) stored in records storage 140. For example, in cases where the records are line items, examples of predefined queries include a query for line items having a meals expense category, a query for line items having a meals expense category that were incurred in San Francisco, Calif., a query for line items having a meals expense category that were incurred in Los Angeles, Calif., a query for line items having a hotel expense category, a query for line items having a hotel expense category that were incurred in Seattle, Wash., a query for line items having a hotel expense category that were incurred in Las Vegas, Nev., etc. One of ordinary skill in the art will realize that query manager 120 can be configured with any number of additional and/or different predefined queries.

At defined intervals (e.g., once per day, once per week, once a month, etc.), query manager 120 sends out for processing queries for different sets of records based on the predefined queries. For example, for each predefined query, query manager 120 generates the query specified by the predefined query and sends it to query processor 125 for further processing. When query manager 120 receives the set of records back from query processor 125, query manager 120 sends the set of records to data preprocessor 130 for further processing.

Query processor 125 handles the processing of queries. For instance, when query processor 125 receives a query from query manager 120, query processor 125 accesses records storage 140 and retrieves a set of records specified by the query. Then, query processor 125 sends the set of records to query manager 120.

Data preprocessor 130 is responsible for performing various preprocessing operations on sets of records. For example, when data preprocessor 130 receives a set of records from query manager 120, data preprocessor 130 may normalize data in the set of records. For instance, in cases where records are line items having a meals expense category, each record in the set of records can include an amount field and a number of persons field for indicating a number of persons attending the meal. To normalize the value of the amount field, data preprocessor 130 calculates a quotient by dividing the value of the amount field by the value of the number of persons field. The quotient represents the amount per person for the meal expense. Data preprocessor 130 can also divide the set of records into groups of records. For example, in cases where records are line items having a meals expense category, data preprocessor 130 divides the set of records into groups of records based on the value of a type of expense field for the meal expense category. Examples of types of expenses for the meal expense category include a breakfast meal, a lunch meal and a dinner meal. Data preprocessor 130 divides the set of records into groups of records so that records in each group of records have the same value for the type of expense field for the meal expense category. Continuing with the example, data preprocessor 130 divides the set of records into a first group of records that each have a value of a breakfast meal in the type of expense field for the meal expense category, a second group of records that each have a value of a lunch meal in the type of expense field for the meal expense category, and a third group of records that each have a value of a dinner meal in the type of expense field for the meal expense category. Any records in the set of records that do not have a value for the type of expense field for the meal expense category is discarded. Once data preprocessor 130 has preprocessed the set of records, data preprocessor 130 sends the groups of records to function manager 135.

Function manager 135 is configured to generate functions for sets of records. In some embodiments, function manager 135 employs a number of different techniques to generate a function for a set of records. For example, when function manager 135 receives groups of records from data preprocessor 130, function manager 135 may calculate a descriptive statistic for each group of records based on the values of the amount field of the records in the group of records. Examples of a descriptive statistic may include a mean value, a median value, a mode value, a trimmed mean value, etc. A mean value is an average of the values in a set of data (e.g., the values of the amount field). A median value is a value separating the higher half of values from the lower half of values in the set of data. A mode value is the value that appears most in the set of data. In some embodiments, a trimmed mean value is calculated by first trimming a defined percentage of values from the set of data (e.g., the bottom 25% of values and the top 25% of values, the bottom 10% of values and the top 10% of values, etc.) and then calculating a mean value from the remaining data in the set of data. As a simple example, a group of records may include the following values for the amount field: 2, 4, 8, 9, 13, 15, 21, 29. To calculate a trimmed mean value where the bottom 25% and top 25% of values are trimmed, function manager 135 trims off the values 2 and 4 (the bottom 25% of values) and the values 21 and 29 (the top 25% of values). Then, function manager 135 calculates a mean value based on the remaining values (i.e., values 8, 9, 13, and 15). The mean value for this example is 11.25 ((8+9+13+15)/4). After function manager 135 has calculated a descriptive statistic for each group of records, function manager 135 generates a function that given an input value, determines a descriptive statistic of a group of records that is closest to the given input value, and predicts a type of expense in an expense category associated with the determined descriptive statistic as being the type associated with the given input value.

FIG. 2 illustrates examples of descriptive statistics for different types of records according to some embodiments. Specifically, FIG. 2 illustrates a table 200 of descriptive statistics for three different types of records: breakfast meal records, lunch meal records, and dinner meal records. The data used in this example originated from a predefined query for line items having a meals expense category that were incurred in San Francisco, Calif. Query manager 120 generated the query specified by the predefined query and sent the query to query processor 125. Once query manager 120 received the set of records back from query processor 125, query manager 120 sent the set of records to data preprocessor 130. Each record in the set of records includes an amount field, a meal expense value for an expense category field, a type of expense field for the meal expense category, and a number of persons field indicating the number of persons attending the meal.

Upon receiving the set of data, data preprocessor 130 normalized the values of the amount field in the set of records based on the amount field and the number of persons field, as described above. Next, data preprocessor 130 divided the set of records into groups of records based on the type of expense field so that records in each group of records have the same value in the type of expense field for the meal expense category. In particular, data preprocessor 130 divided the set of records into three groups of records: a first group of records that each have a value of a breakfast meal in the type of expense field for the meal expense category, a second group of records that each have a value of a lunch meal in the type of expense field for the meal expense category, and a third group of records that each have a value of a dinner meal in the type of expense field for the meal expense category. Data preprocessor 130 sent the three groups of records to function manager 135.

Once function manager 135 received the three groups of records, function manager 135 calculated the descriptive statistics shown in table 200 for each of the three groups of records using the values of the amount field. As shown, table 200 includes three columns 205-215. Column 205 stores descriptive statistics for the breakfast meal group of records, column 210 stores descriptive statistics for the lunch meal group of records, and column 215 stores descriptive statistics for the dinner meal group of records. As illustrated in FIG. 2, table 200 also includes four rows 220-235. Row 220 stores the mean descriptive statistic for each of the groups of records. That is, row 220 of column 205 stores the average amount value for the breakfast meal group of records, row 220 of column 210 stores the average amount value for the lunch meal group of records, and row 220 of column 215 stores the average amount value for the dinner meal group of records. Next, row 225 contains averages determined by trimming the top 25% of amount values and the bottom 25% of amount values and calculating a mean value from the remaining amount values. As shown, row 225 of column 205 stores the trimmed average amount value for the breakfast meal group of records, row 225 of column 210 stores the trimmed average amount value for the lunch meal group of records, and row 225 of column 215 stores the trimmed average amount value for the dinner meal group of records. Row 230 of column 205 stores the value separating the higher half of the amount values from the lower half of values in the breakfast meals group of records, row 230 of column 210 stores the value separating the higher half of the amount values from the lower half of values in the lunch meals group of records, and row 230 of column 215 stores the value separating the higher half of the amount values from the lower half of values in the dinner meals group of records. Finally, row 235 of column 205 stores the amount value that appears most in the breakfast meals group of records, row 235 of column 210 stores the amount value that appears most in the lunch meals group of records, and row 235 of column 215 stores the amount value that appears most in the dinner meals group of records.

As mentioned above, function manager 135 can generate a function that given an input value, determines a descriptive statistic of a group of records that is closest to the given input value, and predicts a type of expense in an expense category associated with the determined descriptive statistic as being the type associated with the given input value. Referring to table 200 for examples, function manager 135 may generate a function based on the mean descriptive statistic (i.e., the values in row 220 in this example). The function can be used to predict a type of expense of a meal expense category for a particular meal expense record. For example, assume a particular record is a meal expense with a normalized value of 35.00 for the amount field. The function would calculate the distance between the normalized value of 35.00 and the descriptive statistic for each of the three groups of records. The meal type associated with the descriptive statistic that has the shortest distance is predicated as the meal type associated with the particular record. Here, the descriptive statistic of the dinner meal type has the shortest distance and, thus, the function predicts that the dinner meal type is the meal type associated the particular record. Function manager 135 can generate different functions use different descriptive statistics to predict a meal type for a particular record. For instance, function manager 135 may generate a function based on trimmed means, a function based on medians, or a function based on modes. These functions operate in a similar manner as the function based on means described above in predicting a meal type associated with a particular record (i.e., using the meal type associated the descriptive statistic that has the shortest distance to the normalized amount of the particular record as the predicated meal type).

In some embodiments, instead of using descriptive statistics, function manager 135 may generate a function based on probability density functions. Using the meal type example described above by reference to FIG. 2 as an example, function manager 135 may determine a first probability density function based on the values of the amount field in the breakfast meal group of records, a second probability density function based on the values of the amount field in the lunch meal group of records, and a third probability density function based on the values of the amount field in the dinner meal group of records. Function manager 135 uses any number of different methods for determining a probability density function. For example, in some embodiments, function manager 135 determines a probability density function using a kernel density estimation (KDE) methodology. In some such embodiments, function manager 135 uses a Gaussian kernel in the KDE methodology. In other such embodiments, function manager 135 uses an Epanechnikov kernel in the KDE methodology. Function manager 135 then generates a function that given an input value, determines probabilities based on the input value using each of the three probability density functions, and predicts a type of expense in an expense category associated with the probability density function that yielded the highest probability as being the type associated with the given input value.

Figure 3:
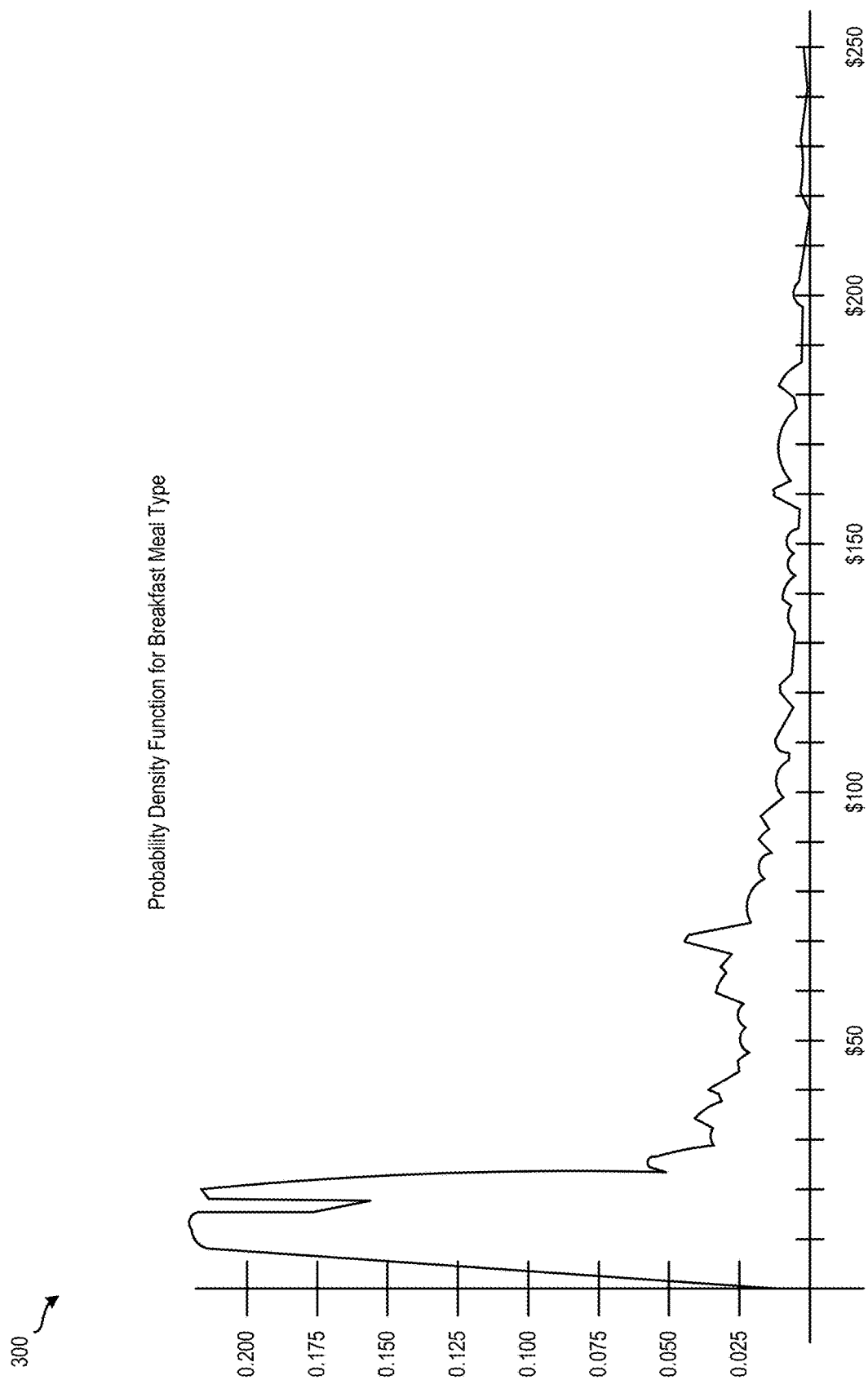
FIG. 3 illustrates an example probability density function for a type of record according to some embodiments.
Figure 4:
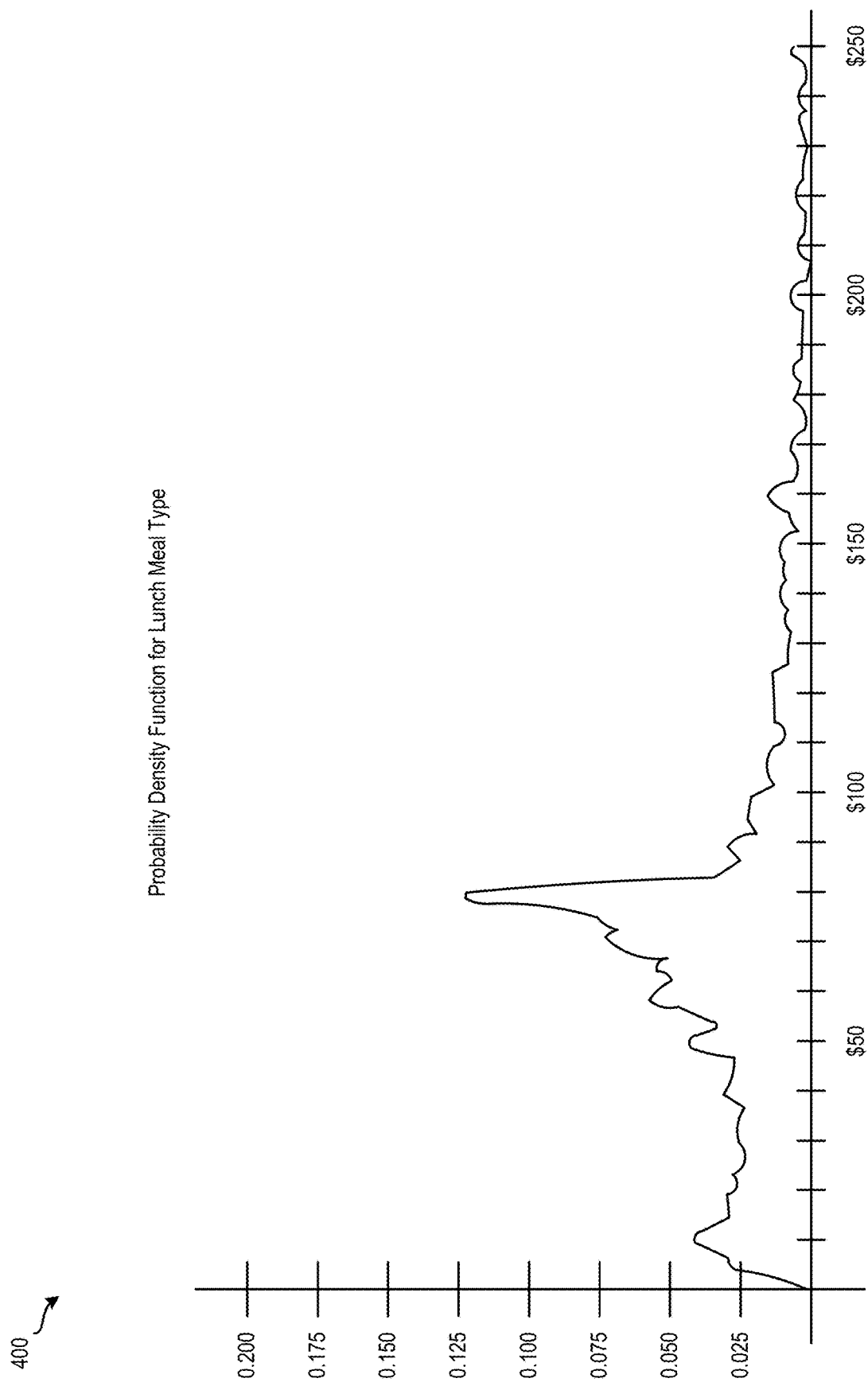
FIG. 4 illustrates another example probability density function for another type of record according to some embodiments.
Figure 5:
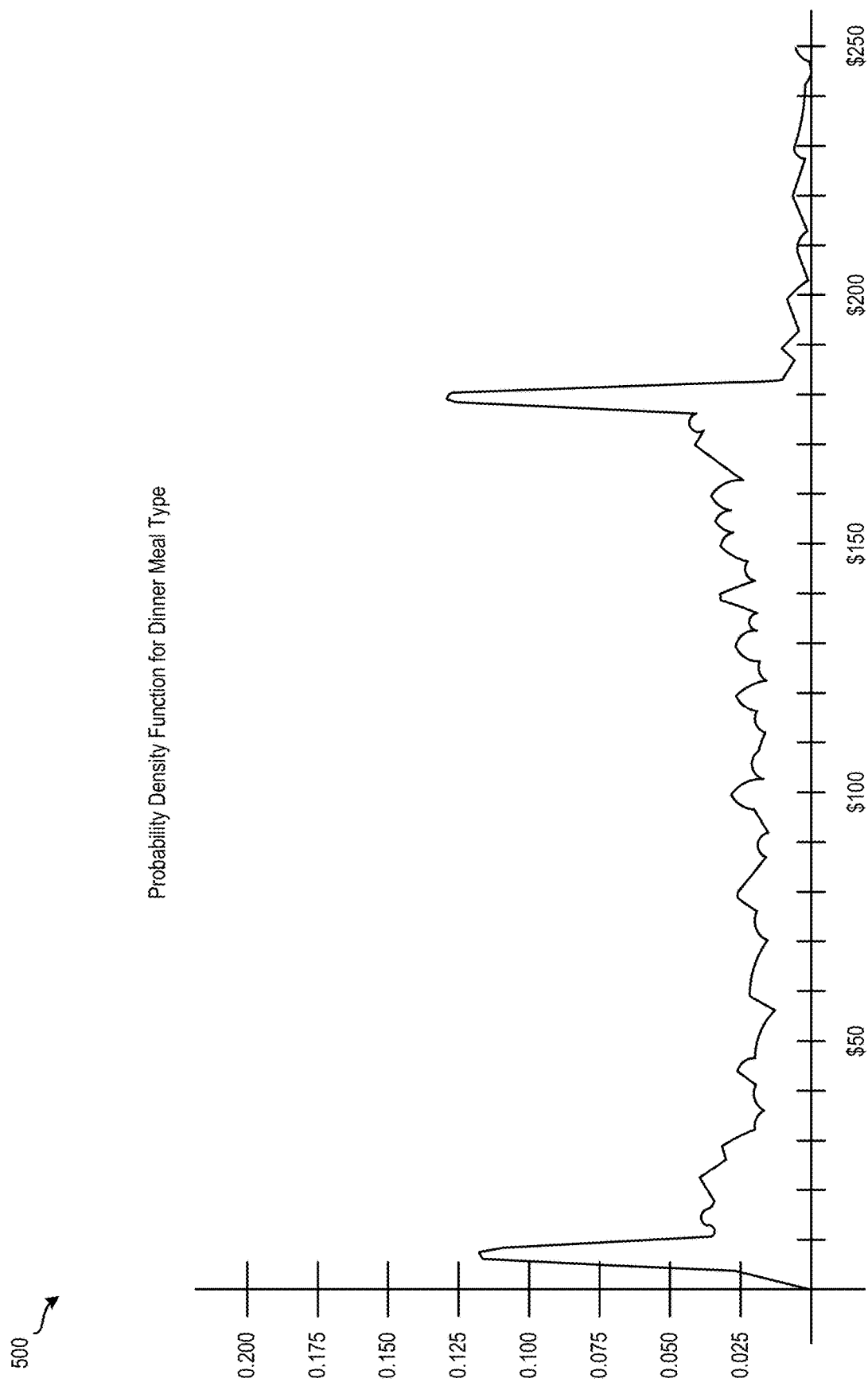
FIG. 5 illustrates another example probability density function for another type of record according to some embodiments.

FIG. 3 illustrates an example probability density function 300 for a type of record according to some embodiments. For this example, function manager 135 determines probability density function 300 from the same data that was used to calculate the descriptive statistics in FIG. 2. In particular, function manager 135 determined probability density function 300 based on the values of the amount field in the breakfast meal group of records. FIG. 4 illustrates another example probability density function 400 for another type of record according to some embodiments. In this example, function manager 135 determines probability density function 400 from the same data that was used to calculate the descriptive statistics in FIG. 2. Here, function manager 135 determined probability density function 400 based on the values of the amount field in the lunch meal group of records. FIG. 5 illustrates another example probability density function 500 for another type of record according to some embodiments. For this example, function manager 135 determines probability density function 500 from the same data that was used to calculate the descriptive statistics in FIG. 2. Specifically, function manager 135 determined probability density function 500 based on the values of the amount field in the dinner meal group of records. As shown, for each of the probability density functions 300-500, a given value for an amount (i.e., the x-axis) has a corresponding probability (i.e., the y-axis), which is the output of the probability density function for the given value. Based on probability density functions 300-500, function manager 135 can generate a function that given an input value, determines probabilities based on the input value using each of the three probability density functions, and predicts a type of expense in an expense category associated with the probability density function that yielded the highest probability as being the type associated with the given input value. For instance, assume a particular record is a meal expense with a normalized value of 80.00 for the amount field. The function would calculate the probability output by each of the probability density functions 300-500 using 80.00 as the input. The meal type associated with the probability density function that outputs the highest probability is predicted as being the meal type associated with the particular record. Here, probability density function 400 outputs the highest probability. As such, the function predicts that the lunch meal type is the meal type associated with the particular record.

Once function manager 135 generates a function for the set of records, function manager 135 stores the function in functions storage 145 for later use. For example, when computing system 115 receives an expense report that includes a line item that belongs to a particular set of records, computing system 115 accesses threshold values storage 145 and retrieves the function determined for the particular set of records. Computing system 115 uses the function to predict a type of expense of an expense category for the line item. For example, line item is an expense that belongs to the meal expense category, computing system 115 uses a function configured to predict meal types to determine a meal type for the line item and stores the line item in records storage 140. In some embodiments, computing system 115 sends a notification to a user (e.g., a user that submitted the expense report) of a client device 105 indicating that the line item is to be reviewed.

Figure 6:
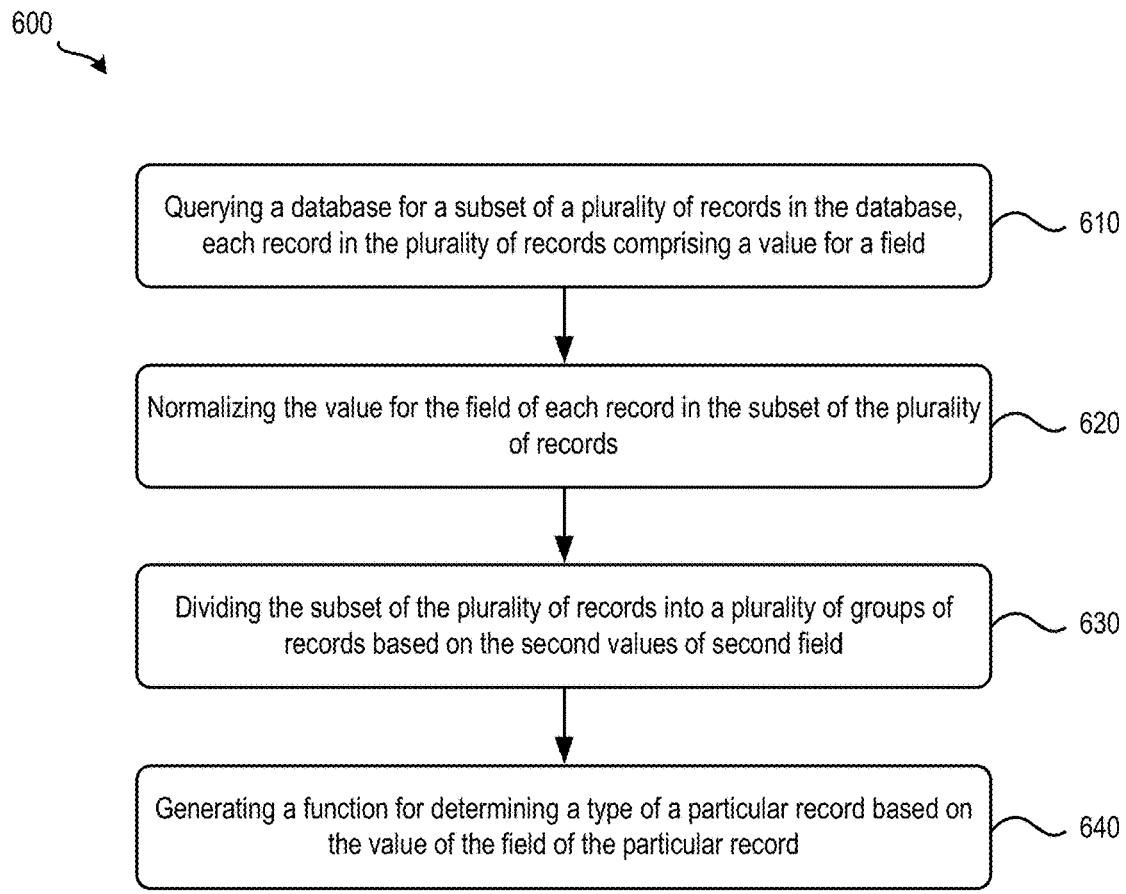
FIG. 6 illustrates a process for determining a function for predicting types of records according to some embodiments.

FIG. 6 illustrates a process 600 for determining a function for predicting types of records according to some embodiments. In some embodiments, computing system 115 performs process 600. Process 600 begins by querying, at 610, a database for a subset of a plurality of records in the database. Each record in the plurality of records comprises a value for a first field and a second value for a second field. Referring to FIG. 1 as an example, query manager 120 may generate a predefined query for line items having a meal expense category that were incurred in San Francisco, Calif. Query manager 120 sends the generated query to query processor 125, which performs operation 610 to retrieve a subset of a plurality of records stored in records storage 140. In this example, the subset of the plurality of records includes line items having a meal expense category that were incurred in San Francisco, Calif.

Next, process 600 normalizes, at 620, the first value of the first field of each record in the subset of the plurality of records. Referring to FIG. 1 as an example, data preprocessor 130 can normalize the value of the amount field of each record in the subset of the plurality of records. For example, in cases where records are line items having a meals expense category, each record can also include a number of persons field for indicating a number of persons attending the meal. To normalize the value of the amount field, data preprocessor 130 calculates a quotient by dividing the value of the amount field by the value of the number of persons field. The quotient represents the amount per person for the meal expense.

Then, process 600 divides, at 630, the subset of the plurality of records into a plurality of groups of records based on the second values of the second field. Referring to FIG. 1 as an example, for a set of records that are meal expense records, data preprocessor 130 divides the set of records into groups of records so that records in each group of records have the same value for the type of expense field for the meal expense category. For instance, data preprocessor 130 can divide the set of records into a first group of records that each have a value of a breakfast meal in the type of expense field for the meal expense category, a second group of records that each have a value of a lunch meal in the type of expense field for the meal expense category, and a third group of records that each have a value of a dinner meal in the type of expense field for the meal expense category.

Finally, process 600 generates, at 640, a function for predicting a type of a particular record based on the value of the field of the particular record. Referring to FIGS. 1 and 2 as an example, function manager 135 can generate the function for predicting a type of a particular record. In some embodiments, function manager 135 generates the function based on descriptive statistics in the same manner as that described above by reference to FIG. 2. In other embodiments, function manager 135 generates the function based on probability density functions using the same techniques that those described above by reference to FIGS. 3-5.

The examples and embodiments discussed above are described by reference to a particular expense category (i.e., meal category) and types of expenses in the particular expense category (i.e., breakfast meal, lunch meal, and dinner meal). One of ordinary skill in the art will appreciate that the techniques described here can also be applied to other expense categories and the respective types of expenses in the expense categories. For instance, the techniques may be applied to a lodging category where the determined functions are configured to predict a type of lodging in the lodging category (e.g., hotel lodging, motel lodging, hostel lodging, campground lodging, etc.). As another example, the techniques may be applied to a transport category where the determined functions are configured to predict a type of transport in the transport category (e.g., taxi transport, airplane transport, train transport, etc.).

Figure 7:
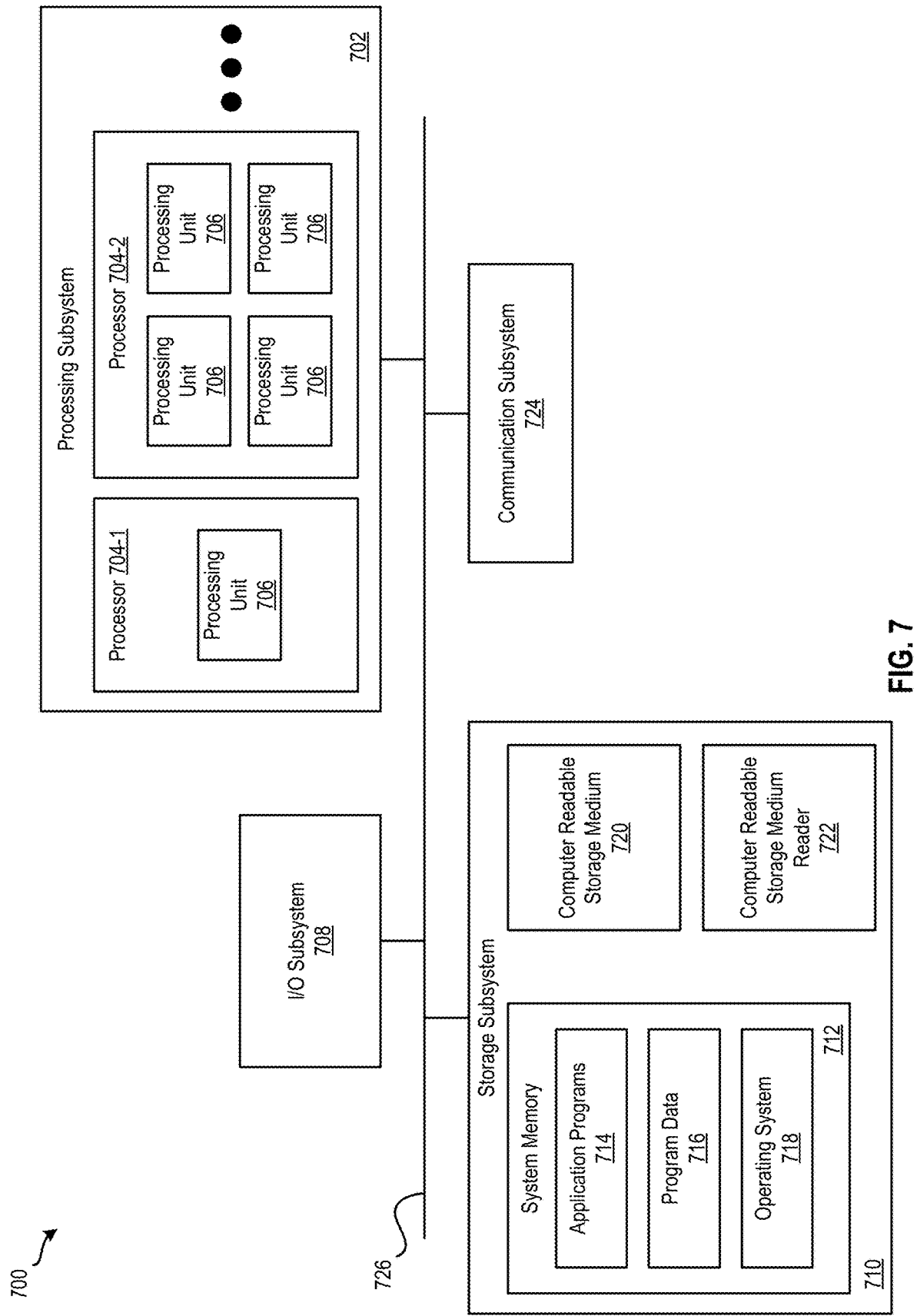
FIG. 7 illustrates an exemplary computer system, in which various embodiments may be implemented.

FIG. 7 illustrates an exemplary computer system 700 for implementing various embodiments described above. For example, computer system 700 may be used to implement systems client devices 105*a-n* and computing system 115. Computer system 700 may be a desktop computer, a laptop, a server computer, or any other type of computer system or combination thereof. Some or all elements of client applications 110*a-n*, query manager 120, query processor 125, data preprocessor 130, function manager 135, or combinations thereof can be included or implemented in computer system 700. In addition, computer system 700 can implement many of the operations, methods, and/or processes described above (e.g., process 600). As shown in FIG. 7, computer system 700 includes processing subsystem 702, which communicates, via bus subsystem 726, with input/output (I/O) subsystem 708, storage subsystem 710 and communication subsystem 724.

Bus subsystem 726 is configured to facilitate communication among the various components and subsystems of computer system 700. While bus subsystem 726 is illustrated in FIG. 7 as a single bus, one of ordinary skill in the art will understand that bus subsystem 726 may be implemented as multiple buses. Bus subsystem 726 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 702, which can be implemented as one or more integrated circuits (e.g., a conventional microprocessor or microcontroller), controls the operation of computer system 700. Processing subsystem 702 may include one or more processors 704. Each processor 704 may include one processing unit 706 (e.g., a single core processor such as processor 704-1) or several processing units 706 (e.g., a multicore processor such as processor 704-2). In some embodiments, processors 704 of processing subsystem 702 may be implemented as independent processors while, in other embodiments, processors 704 of processing subsystem 702 may be implemented as multiple processors integrate into a single chip or multiple chips. Still, in some embodiments, processors 704 of processing subsystem 702 may be implemented as a combination of independent processors and multiple processors integrated into a single chip or multiple chips.

In some embodiments, processing subsystem 702 can execute a variety of programs or processes in response to program code and can maintain multiple concurrently executing programs or processes. At any given time, some or all of the program code to be executed can reside in processing subsystem 702 and/or in storage subsystem 710. Through suitable programming, processing subsystem 702 can provide various functionalities, such as the functionalities described above by reference to process 600, etc.

I/O subsystem 708 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 700 to a user or another device (e.g., a printer).

As illustrated in FIG. 7, storage subsystem 710 includes system memory 712, computer-readable storage medium 720, and computer-readable storage medium reader 722. System memory 712 may be configured to store software in the form of program instructions that are loadable and executable by processing subsystem 702 as well as data generated during the execution of program instructions. In some embodiments, system memory 712 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 712 may include different types of memory, such as static random access memory (SRAM) and/or dynamic random access memory (DRAM). System memory 712 may include a basic input/output system (BIOS), in some embodiments, that is configured to store basic routines to facilitate transferring information between elements within computer system 700 (e.g., during start-up). Such a BIOS may be stored in ROM (e.g., a ROM chip), flash memory, or any other type of memory that may be configured to store the BIOS.

As shown in FIG. 7, system memory 712 includes application programs 714 (e.g., client application 110*a-n*), program data 716, and operating system (OS) 718. OS 718 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 720 may be a non-transitory computer-readable medium configured to store software (e.g., programs, code modules, data constructs, instructions, etc.). Many of the components (e.g., client applications 110*a-n*, query manager 120, query processor 125, data preprocessor 130, and function manager 135) and/or processes (e.g., process 600) described above may be implemented as software that when executed by a processor or processing unit (e.g., a processor or processing unit of processing subsystem 702) performs the operations of such components and/or processes. Storage subsystem 710 may also store data used for, or generated during, the execution of the software.

Storage subsystem 710 may also include computer-readable storage medium reader 722 that is configured to communicate with computer-readable storage medium 720. Together and, optionally, in combination with system memory 712, computer-readable storage medium 720 may comprehensively represent remote, local, fixed, and/or removable storage devices plus storage media for temporarily and/or more permanently containing, storing, transmitting, and retrieving computer-readable information.

Computer-readable storage medium 720 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 724 serves as an interface for receiving data from, and transmitting data to, other devices, computer systems, and networks. For example, communication subsystem 724 may allow computer system 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 724 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 724 may provide components configured for wired communication (e.g., Ethernet) in addition to or instead of components configured for wireless communication.

One of ordinary skill in the art will realize that the architecture shown in FIG. 7 is only an example architecture of computer system 700, and that computer system 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
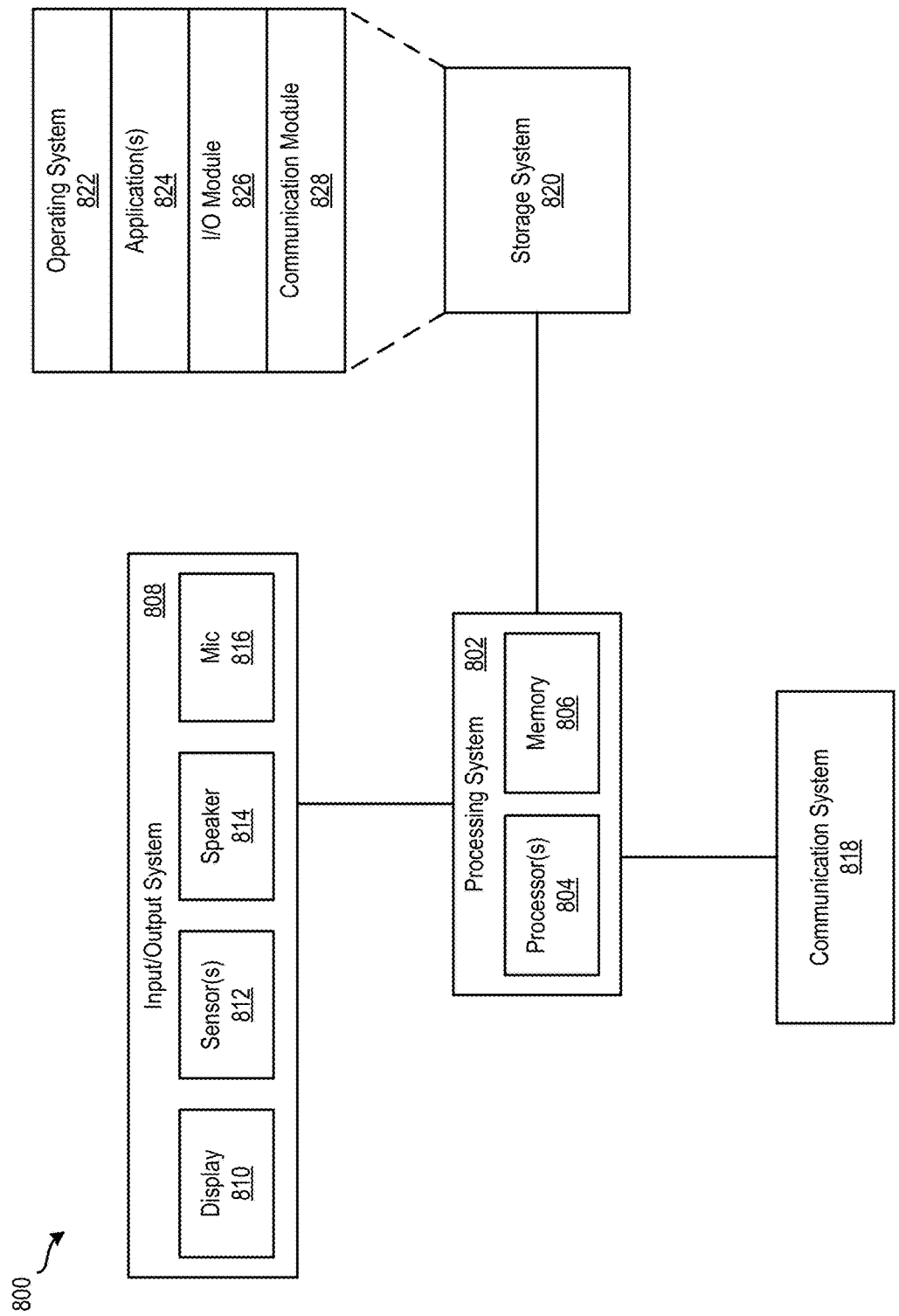
FIG. 8 illustrates an exemplary computing device, in which various embodiments may be implemented.

FIG. 8 illustrates an exemplary computing device 800 for implementing various embodiments described above. For example, computing device 800 may be used to implement devices client devices 105a-n. Computing device 800 may be a cellphone, a smartphone, a wearable device, an activity tracker or manager, a tablet, a personal digital assistant (PDA), a media player, or any other type of mobile computing device or combination thereof. Some or all elements of client applications 80a-n or combinations thereof can be included or implemented in computing device 800. As shown in FIG. 8, computing device 800 includes processing system 802, input/output (I/O) system 808, communication system 818, and storage system 820. These components may be coupled by one or more communication buses or signal lines.

Processing system 802, which can be implemented as one or more integrated circuits (e.g., a conventional microprocessor or microcontroller), controls the operation of computing device 800. As shown, processing system 802 includes one or more processors 804 and memory 806. Processors 804 are configured to run or execute various software and/or sets of instructions stored in memory 806 to perform various functions for computing device 800 and to process data.

Each processor of processors 804 may include one processing unit (e.g., a single core processor) or several processing units (e.g., a multicore processor). In some embodiments, processors 804 of processing system 802 may be implemented as independent processors while, in other embodiments, processors 804 of processing system 802 may be implemented as multiple processors integrate into a single chip. Still, in some embodiments, processors 804 of processing system 802 may be implemented as a combination of independent processors and multiple processors integrated into a single chip.

Memory 806 may be configured to receive and store software (e.g., operating system 822, applications 824, I/O module 826, communication module 828, etc. from storage system 820) in the form of program instructions that are loadable and executable by processors 804 as well as data generated during the execution of program instructions. In some embodiments, memory 806 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 808 is responsible for receiving input through various components and providing output through various components. As shown for this example, I/O system 808 includes display 810, one or more sensors 812, speaker 814, and microphone 816. Display 810 is configured to output visual information (e.g., a graphical user interface (GUI) generated and/or rendered by processors 804). In some embodiments, display 810 is a touch screen that is configured to also receive touch-based input. Display 810 may be implemented using liquid crystal display (LCD) technology, light-emitting diode (LED) technology, organic LED (OLED) technology, organic electro luminescence (OEL) technology, or any other type of display technologies. Sensors 812 may include any number of different types of sensors for measuring a physical quantity (e.g., temperature, force, pressure, acceleration, orientation, light, radiation, etc.). Speaker 814 is configured to output audio information and microphone 816 is configured to receive audio input. One of ordinary skill in the art will appreciate that I/O system 808 may include any number of additional, fewer, and/or different components. For instance, I/O system 808 may include a keypad or keyboard for receiving input, a port for transmitting data, receiving data and/or power, and/or communicating with another device or component, an image capture component for capturing photos and/or videos, etc.

Communication system 818 serves as an interface for receiving data from, and transmitting data to, other devices, computer systems, and networks. For example, communication system 818 may allow computing device 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 818 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 818 may provide components configured for wired communication (e.g., Ethernet) in addition to or instead of components configured for wireless communication.

Storage system 820 handles the storage and management of data for computing device 800. Storage system 820 may be implemented by one or more non-transitory machine-readable mediums that are configured to store software (e.g., programs, code modules, data constructs, instructions, etc.) and store data used for, or generated during, the execution of the software. Many of the components (e.g., client applications 110*a-n*) described above may be implemented as software that when executed by a processor or processing unit (e.g., processors 804 of processing system 802) performs the operations of such components and/or processes.

In this example, storage system 820 includes operating system 822, one or more applications 824, I/O module 826, and communication module 828. Operating system 822 includes various procedures, sets of instructions, software components and/or drivers for controlling and managing general system tasks (e.g., memory management, storage device control, power management, etc.) and facilitates communication between various hardware and software components. Operating system 822 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 824 can include any number of different applications installed on computing device 800. For example, client applications 110*a-n* may be installed on computing device 800. Other examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 826 manages information received via input components (e.g., display 810, sensors 812, and microphone 816) and information to be outputted via output components (e.g., display 810 and speaker 814). Communication module 828 facilitates communication with other devices via communication system 818 and includes various software components for handling data received from communication system 818.

One of ordinary skill in the art will realize that the architecture shown in FIG. 8 is only an example architecture of computing device 800, and that computing device 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
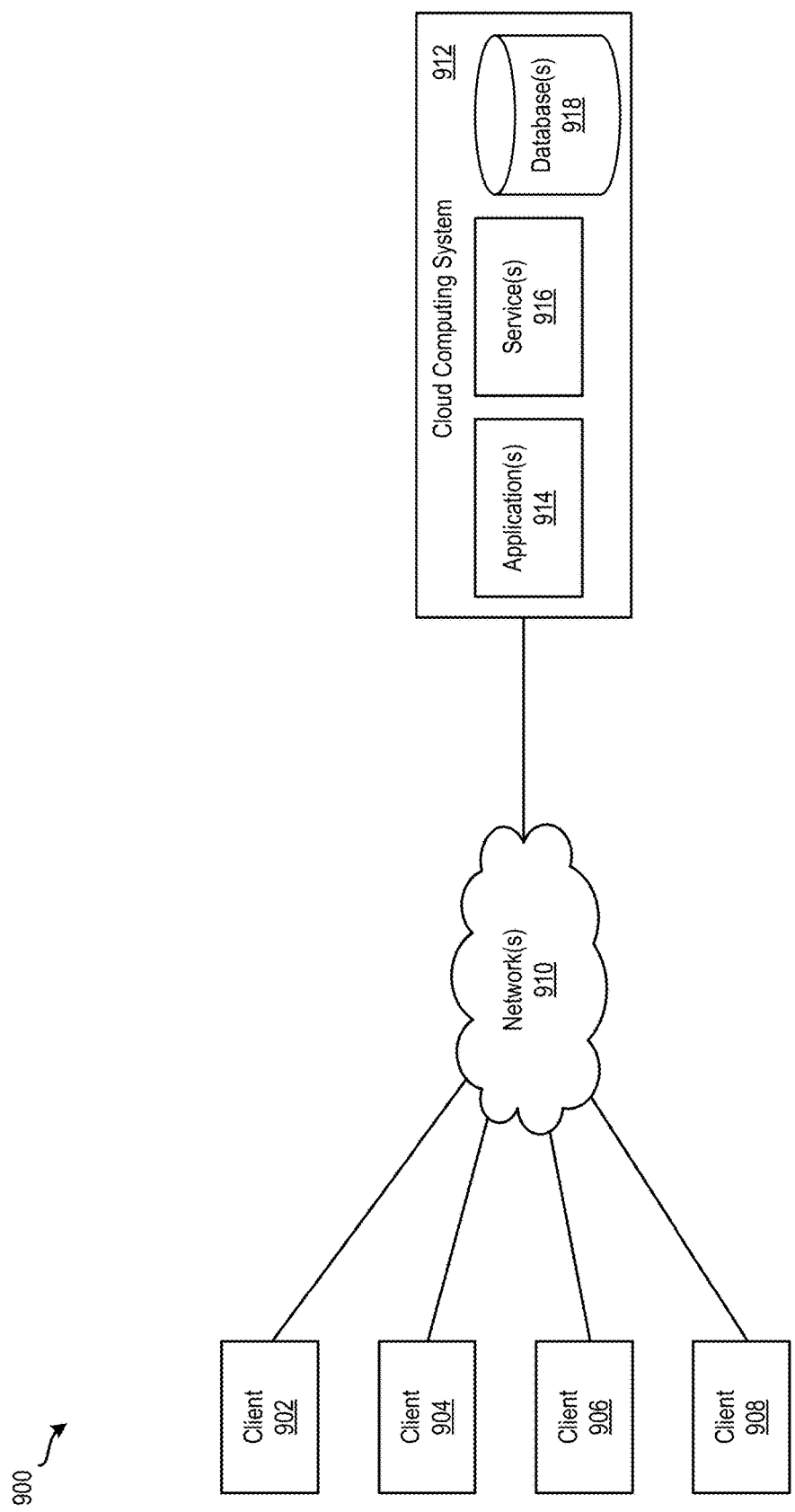
FIG. 9 illustrates an exemplary system, in which various embodiments may be implemented.

FIG. 9 illustrates an exemplary system 900 for implementing various embodiments described above. For example, cloud computing system 912 may be used to implement computing system 115 and client devices 902-908 may be used to implement client devices 105*a-n*. As shown, system 900 includes client devices 902-908, one or more networks 910, and cloud computing system 912. Cloud computing system 912 is configured to provide resources and data to client devices 902-908 via networks 910. In some embodiments, cloud computing system 900 provides resources to any number of different users (e.g., customers, tenants, organizations, etc.). Cloud computing system 912 may be implemented by one or more computer systems (e.g., servers), virtual machines operating on a computer system, or a combination thereof.

As shown, cloud computing system 912 includes one or more applications 914, one or more services 916, and one or more databases 918. Cloud computing system 900 may provide applications 914, services 916, and databases 918 to any number of different customers in a self-service, subscription-based, elastically scalable, reliable, highly available, and secure manner.

In some embodiments, cloud computing system 900 may be adapted to automatically provision, manage, and track a customer's subscriptions to services offered by cloud computing system 900. Cloud computing system 900 may provide cloud services via different deployment models. For example, cloud services may be provided under a public cloud model in which cloud computing system 900 is owned by an organization selling cloud services and the cloud services are made available to the general public or different industry enterprises. As another example, cloud services may be provided under a private cloud model in which cloud computing system 900 is operated solely for a single organization and may provide cloud services for one or more entities within the organization. The cloud services may also be provided under a community cloud model in which cloud computing system 900 and the cloud services provided by cloud computing system 900 are shared by several organizations in a related community. The cloud services may also be provided under a hybrid cloud model, which is a combination of two or more of the aforementioned different models.

In some instances, any one of applications 914, services 916, and databases 918 made available to client devices 902-908 via networks 910 from cloud computing system 900 is referred to as a "cloud service." Typically, servers and systems that make up cloud computing system 900 are different from the on-premises servers and systems of a customer. For example, cloud computing system 900 may host an application and a user of one of client devices 902-908 may order and use the application via networks 910.

Applications 914 may include software applications that are configured to execute on cloud computing system 912

(e.g., a computer system or a virtual machine operating on a computer system) and be accessed, controlled, managed, etc. via client devices 902-908. In some embodiments, applications 914 may include server applications and/or mid-tier applications (e.g., HTTP (hypertext transport protocol) server applications, FTP (file transfer protocol) server applications, CGI (common gateway interface) server applications, JAVA server applications, etc.). Services 916 are software components, modules, application, etc. that are configured to execute on cloud computing system 912 and provide functionalities to client devices 902-908 via networks 910. Services 916 may be web-based services or on-demand cloud services.

Databases 918 are configured to store and/or manage data that is accessed by applications 914, services 916, and/or client devices 902-908. For instance, storages 140 and 145 may be stored in databases 918. Databases 918 may reside on a non-transitory storage medium local to (and/or resident in) cloud computing system 912, in a storage-area network (SAN), on a non-transitory storage medium local located remotely from cloud computing system 912. In some embodiments, databases 918 may include relational databases that are managed by a relational database management system (RDBMS). Databases 918 may be a column-oriented databases, row-oriented databases, or a combination thereof. In some embodiments, some or all of databases 918 are in-memory databases. That is, in some such embodiments, data for databases 918 are stored and managed in memory (e.g., random access memory (RAM)).

Client devices 902-908 are configured to execute and operate a client application (e.g., a web browser, a proprietary client application, etc.) that communicates with applications 914, services 916, and/or databases 918 via networks 910. This way, client devices 902-908 may access the various functionalities provided by applications 914, services 916, and databases 918 while applications 914, services 916, and databases 918 are operating (e.g., hosted) on cloud computing system 900. Client devices 902-908 may be computer system 900 or computing device 800, as described above by reference to FIGS. 7 and 8, respectively. Although system 900 is shown with four client devices, any number of client devices may be supported.

Networks 910 may be any type of network configured to facilitate data communications among client devices 902-908 and cloud computing system 912 using any of a variety of network protocols. Networks 910 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:

querying a database for a subset of a plurality of records in the database, each record in the plurality of records comprising a first value for a first field and a second value for a second field;

normalizing the first value of the first field of each record in the subset of the plurality of records;

dividing the subset of the plurality of records into a plurality of groups of records based on the second values of the second field; and generating a function for predicting a type of a particular record based on a value of a field of the particular record and the first values of the first field of records in the plurality of groups of records.

2. The non-transitory machine-readable medium of claim 1, wherein generating the function comprises, for each group of records, calculating a descriptive statistic of the first values of the first field of records in the group of records, wherein the function determines the type of the particular record by:

determining a descriptive statistic in the descriptive statistics calculated for the plurality of groups of records that is closest to the value of the field of the particular record and determining the type of the particular record based on the second values of records in the group of records from which the determined descriptive statistic is calculated.

3. The non-transitory machine-readable medium of claim 2, wherein the descriptive statistic is a mean value, a median value, or a mode value.

4. The non-transitory machine-readable medium of claim 1, wherein generating the function comprises, for each group of records, calculating a probability density function of the first values of the first field of records in the group of records, wherein the function determines the type of the particular record by:

calculating, for each group of records in the plurality of groups of records, a probability value using the value of the field of the particular record as input to the probability density function calculated for the group of records, determining a highest probability value in the probability values calculated for the plurality of groups of records, and determining the type of the particular record based on the second values of records in the group of records from which the probability density function of the determined highest probability value is calculated.

5. The non-transitory machine-readable medium of claim 4, wherein calculating the probability density function for each group of records comprises using a kernel density estimation algorithm.

6. The non-transitory machine-readable medium of claim 1, wherein each record in the plurality of records further comprises a third value for a third field, wherein normalizing the first value for the first field of each record in the subset of the plurality of records comprises:

calculating a quotient by dividing the first value for the first field by the third value of the third field; and using the quotient as the normalized first value for the first field.

7. The non-transitory machine-readable medium of claim 1, wherein dividing the subset of the plurality of records into the plurality of groups of records based on the second values of the second field comprises dividing the subset of the plurality of records into the plurality of groups of records so that records in each group of records have the same second values for the second field.

8. A method comprising:
querying a database for a subset of a plurality of records in the database, each record in the plurality of records comprising a first value for a first field and a second value for a second field;
normalizing the first value of the first field of each record in the subset of the plurality of records;
dividing the subset of the plurality of records into a plurality of groups of records based on the second values of the second field; and
generating a function for predicting a type of a particular record based on a value of a field of the particular record and the first values of the first field of records in the plurality of groups of records.

9. The method of claim 8, wherein generating the function comprises, for each group of records, calculating a descriptive statistic of the first values of the first field of records in the group of records,
wherein the function determines the type of the particular record by:
determining a descriptive statistic in the descriptive statistics calculated for the plurality of groups of records that is closest to the value of the field of the particular record and
determining the type of the particular record based on the second values of records in the group of records from which the determined descriptive statistic is calculated.

10. The method of claim 9, wherein the descriptive statistic is a mean value, a median value, or a mode value.

11. The method of claim 8, wherein generating the function comprises, for each group of records, calculating a probability density function of the first values of the first field of records in the group of records,
wherein the function determines the type of the particular record by:
calculating, for each group of records in the plurality of groups of records, a probability value using the value of the field of the particular record as input to the probability density function calculated for the group of records,
determining a highest probability value in the probability values calculated for the plurality of groups of records, and
determining the type of the particular record based on the second values of records in the group of records from which the probability density function of the determined highest probability value is calculated.

12. The method of claim 11, wherein calculating the probability density function for each group of records comprises using a kernel density estimation algorithm.

13. The method of claim 8, wherein each record in the plurality of records further comprises a third value for a third field, wherein normalizing the first value for the first field of each record in the subset of the plurality of records comprises:
calculating a quotient by dividing the first value for the first field by the third value of the third field; and
using the quotient as the normalized first value for the first field.

14. The method of claim 8, wherein dividing the subset of the plurality of records into the plurality of groups of records based on the second values of the second field comprises dividing the subset of the plurality of records into the plurality of groups of records so that records in each group of records have the same second values for the second field.

15. A system comprising:
a set of processing units; and
a non-transitory machine-readable medium storing instructions that when executed by at least one processing unit in the set of processing units cause the at least one processing unit to:
query a database for a subset of a plurality of records in the database, each record in the plurality of records comprising a first value for a first field and a second value for a second field;
normalize the first value of the first field of each record in the subset of the plurality of records;
divide the subset of the plurality of records into a plurality of groups of records based on the second values of the second field; and
generate a function for predicting a type of a particular record based on a value of a field of the particular record and the first values of the first field of records in the plurality of groups of records.

16. The system of claim 15, wherein generating the function comprises, for each group of records, calculating a descriptive statistic of the first values of the first field of records in the group of records,
wherein the function determines the type of the particular record by:
determining a descriptive statistic in the descriptive statistics calculated for the plurality of groups of records that is closest to the value of the field of the particular record and
determining the type of the particular record based on the second values of records in the group of records from which the determined descriptive statistic is calculated.

17. The system of claim 16, wherein the descriptive statistic is a mean value, a median value, or a mode value.

18. The system of claim 15, wherein generating the function comprises, for each group of records, calculating a probability density function of the first values of the first field of records in the group of records,
wherein the function determines the type of the particular record by:
calculating, for each group of records in the plurality of groups of records, a probability value using the value of the field of the particular record as input to the probability density function calculated for the group of records,
determining a highest probability value in the plurality of probability values calculated for the plurality of groups of records, and
determining the type of the particular record based on the second values of records in the group of records from which the probability density function of the determined highest probability value is calculated.

19. The system of claim 18, wherein calculating the probability density function for each group of records comprises using a kernel density estimation algorithm.

20. The system of claim 15, wherein each record in the plurality of records further comprises a third value for a third field, wherein normalizing the first value for the first field of each record in the subset of the plurality of records comprises:
calculating a quotient by dividing the first value for the first field by the third value of the third field; and using the quotient as the normalized first value for the first field.

\* \* \* \* \*